United States Patent
Naylor

(10) Patent No.: US 10,456,926 B1
(45) Date of Patent: Oct. 29, 2019

(54) ROBOTICALLY ASSISTED POWER LINE AERIAL DIVERTER MOUNTING TOOL

(71) Applicant: Connell Naylor, Rock Springs, WY (US)

(72) Inventor: Connell Naylor, Rock Springs, WY (US)

( * ) Notice: Subject to any disclaimer, the term of this patent is extended or adjusted under 35 U.S.C. 154(b) by 0 days.

(21) Appl. No.: 16/160,401

(22) Filed: Oct. 15, 2018

(51) Int. Cl.
*B25J 15/00* (2006.01)
*B64C 39/02* (2006.01)

(52) U.S. Cl.
CPC ....... *B25J 15/0033* (2013.01); *B25J 15/0019* (2013.01); *B64C 39/024* (2013.01); *B64C 2201/128* (2013.01)

(58) Field of Classification Search
CPC ................ B25J 15/0014; B25J 15/0019; B25J 15/0033; B25J 15/0042; B25J 15/0095; B64C 39/024; B64C 2201/126; B64C 2201/128; H02G 1/02
USPC .................................................. 294/174, 175
See application file for complete search history.

(56) References Cited

U.S. PATENT DOCUMENTS

| | | | | |
|---|---|---|---|---|
| 1,440,200 | A * | 12/1922 | Wood | B60M 1/24 24/135 R |
| 1,793,732 | A * | 2/1931 | Bodendieck | H02G 1/02 248/49 |
| 6,474,197 | B1 * | 11/2002 | Browen | H01H 85/0208 294/174 |
| 9,932,110 | B2 * | 4/2018 | McNally | B64C 39/024 |
| 10,065,327 | B1 * | 9/2018 | Chen | B25J 15/0408 |
| 2016/0236346 | A1 * | 8/2016 | Lee | B25J 9/10 |
| 2018/0244389 | A1 * | 8/2018 | Herlocker | B64D 1/08 |

\* cited by examiner

*Primary Examiner* — Dean J Kramer

(57) ABSTRACT

A robotically assisted power line aerial diverter mounting tool enables a UAV to attach an aerial diverter, or other power line safety equipment, to a power line. To do this, the mounting tool has a mounting plate, a robot-attachment assembly, an intermediary connection mechanism, a mounting receptacle, an extension member, and a diverter-manipulation assembly. The robot-attachment assembly is a rigid frame that is mounted onto one side of mounted plate. The robot-attachment assembly has adjustable fasteners that enable the mounting tool to be affixed to the UAV. The connection mechanism is a detachable fastening system that is mounted onto the mounting plate, opposite to the robot-attachment assembly. The mounting receptacle extends into the connection mechanism so that the extension member can be attached to the connection mechanism. Further, one end of the extension member engages into the receptacle and the diverter manipulation assembly is mounted to the opposite end.

9 Claims, 9 Drawing Sheets

US 10,456,926 B1

ROBOTICALLY ASSISTED POWER LINE AERIAL DIVERTER MOUNTING TOOL

FIELD OF THE INVENTION

The present invention relates generally to an unmanned aerial vehicle (UAV)-mounted manipulator tool. More specifically, the present invention relates to a manipulator tool that enables a UAV to affixing aerial diverters onto a power line.

BACKGROUND OF THE INVENTION

Performing maintenance on a power line is an inherently dangerous occupation. Linemen are forced to perform repairs on power lines while suspended hundreds of feet above the ground. To compound this danger, birds frequently do not see the power line and can crash into the power line or the lineman. This poses a threat to both the linemen and the birds. Further, because power lines are suspended hundreds of feet in the air, they can pose a threat to aerial vehicles as well as wildlife. Traditionally, the lineman has to manually mount an aerial diverter onto the power line. This poses a problem because the lineman is forced to work on the power line before the aerial diver is actually placed. Thus, leaving the lineman vulnerable to collision with an airborne object.

The present invention, the robotically assisted power line aerial diverter mounting tool, addresses this issue by enabling aerial diverters to be mounted onto the power line by a UAV. This functionality enables the lineman to remain on the ground while the UAV mounts the aerial diverter onto the power line. Additionally, embodiments of the present invention are designed to enable the UAV to mount various pieces of equipment onto the powerline. Thus, reducing the amount of time the lineman must physically interact with the power line. Thereby, limiting the amount of time the lineman is exposed to danger from electrocution, collision or falling.

DETAIL DESCRIPTIONS OF THE INVENTION

Figure 1:
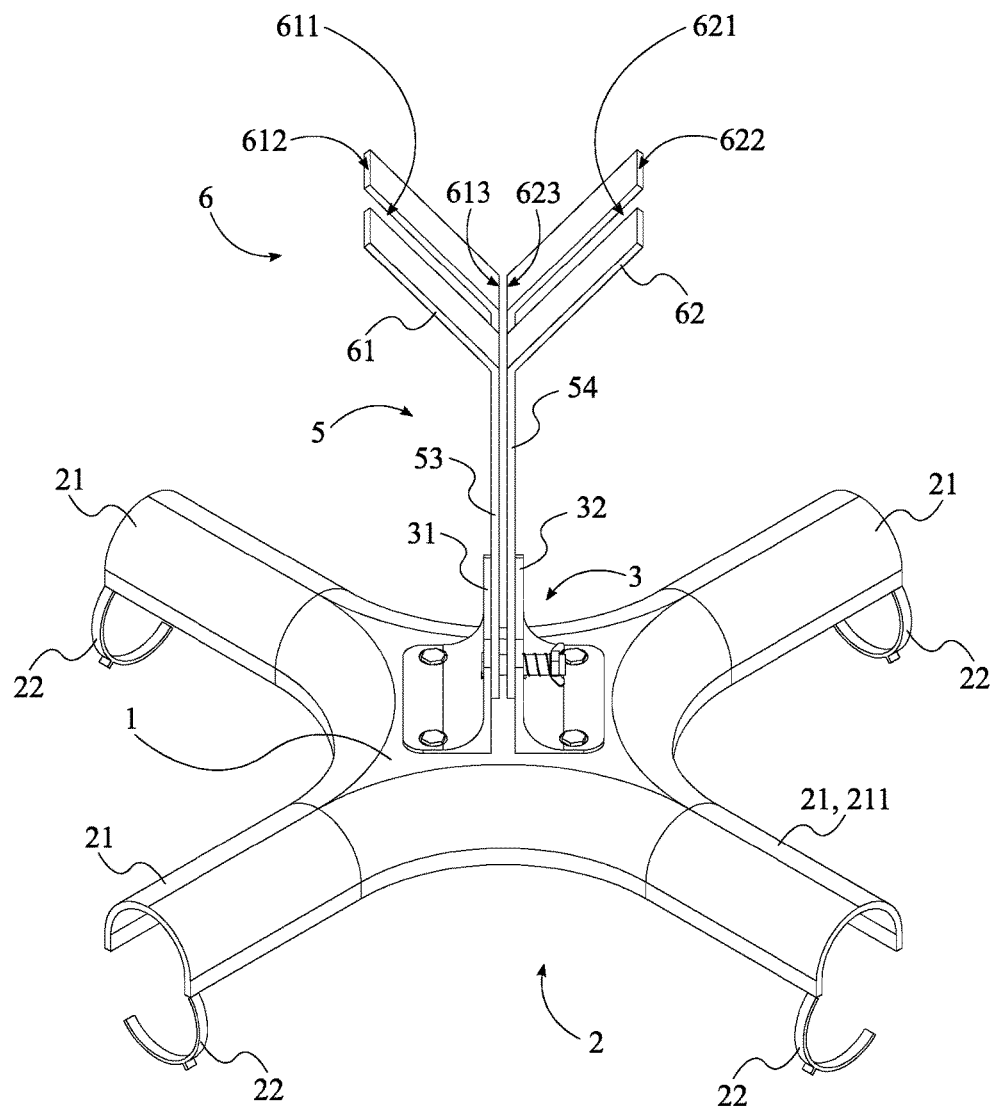
FIG. 1 is a top perspective view of the present invention.

All illustrations of the drawings are for the purpose of describing selected versions of the present invention and are not intended to limit the scope of the present invention.

In reference to FIG. 1 through FIG. 9, the present invention, the robotically assisted power line diverter mounting tool, is a manipulator mechanism that enables an unmanned aerial vehicle (UAV) to mount an aerial diverter or other type of safety equipment onto a power line. Specifically, the present invention functions as a manipulator arm that is mounted onto to the UAV at one end and grasps the areal diverter at the opposite end. To accomplish this, the present invention comprises a mounting plate 1, a robot-attachment assembly 2, an intermediary connection mechanism 3, a mounting receptacle 4, and an extension member 5. The robot-attachment assembly 2 is a rigid frame that enables the present invention to be mounted onto the UAV. Additionally, the robot-attachment assembly 2 is mounted onto the mounting plate 1. Accordingly, the robot-attachment assembly 2 enables the mounting plate 1 to be affixed to the UAV. Preferably the robot-attachment assembly 2 includes a plurality of fastening mechanisms that enable the present invention to be mounted onto UAVs of varying shape and size. Further, the robot-attachment assembly 2 is designed to mount the present invention onto the UAV at a position advantageous for mounting the aerial diverter onto the power line. For example, the robot-attachment assembly 2 can be configured to mount the present invention on top of or beneath of the UAV.

In reference to FIG. 1 and FIG. 7, the present invention is designed to function as a modular system that can be disassembled and then subsequently reassembled for storage and deployment. To that end, the intermediary connection mechanism 3 is a detachable fastener that can be disengaged or reengaged by the user, as desired. Additionally, the intermediary connection mechanism 3 is mounted onto the mounting plate 1, opposite to the robot-attachment assembly 2. As a result, the intermediary connection mechanism 3 is positioned to enable a manipulator system to be attached to the present invention while the present invention is attached to the UAV. Specifically, the intermediary connection mechanism 3 functions as a fastening system that enables the user to attach various manipulators including, but not limited to, robotic arms, adjustable booms, and hooks. In the present invention, the extension member 5 functions an elongated rigid arm for the manipulator system. The mounting receptacle 4, traverses into the into the intermediary connection mechanism 3, normal to the mounting plate 1. Additionally, a first end 51 of the extension member 5 engages into the mounting receptacle 4. As a result, the first end 51 of the extension member 5 is mounted onto the UAV while the opposite end is positioned offset from the UAV. Further, the mounting receptacle 4 retains the extension member 5 in a desired orientation while being held in place by the intermediary connection mechanism 3. Alternative embodiments of the present invention replace the extension member 5 with length-adjustable or articulated robotic arms.

Figure 7:
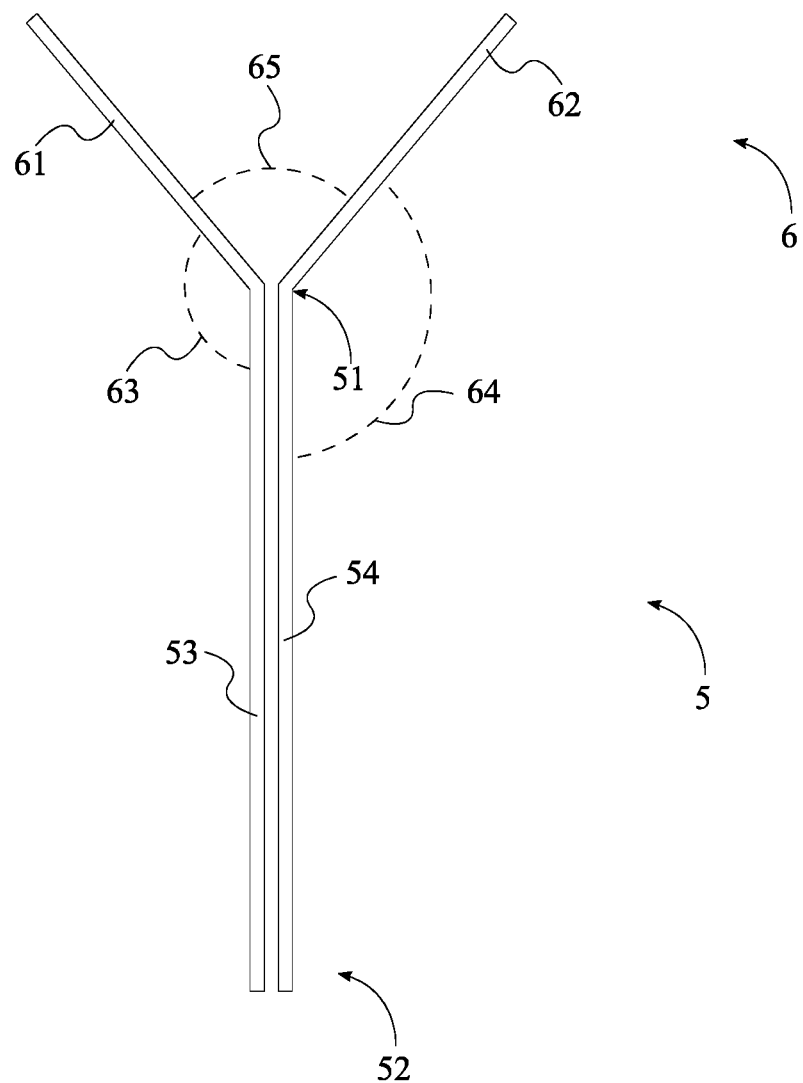
FIG. 7 is a perspective view of the extension member used in the present invention.

In reference to FIG. 1 and FIG. 7, as described above, the present invention is designed to enable the UAV to mount an aerial diverter onto a power line. To facilitate this, the diverter-manipulation assembly 6 is an end effector that is designed to hold the aerial diverter in an orientation that facilitates attaching the aerial diverter onto the power line. Further, the diverter-manipulation assembly 6 is mounted onto a second end 54 of the extension member 5, opposite to the mounting receptacle 4. Accordingly, the extension member 5 and the diverter-manipulation assembly 6 act as the manipulator assembly with the extension member 5 functioning as an arm and the diverter-manipulation assembly 6 functioning as an end effector. This arrangement enables the diverter-manipulation assembly 6 to maintain the aerial diverter in a position that facilitates mounting the aerial diverter onto the power line. For example, the location of the diverter-manipulation assembly 6 ensures that the rotors of the UAV do not collide with the aerial diverter or the power line while the UAV is mounting the aerial diverter onto the power line.

Figure 2:
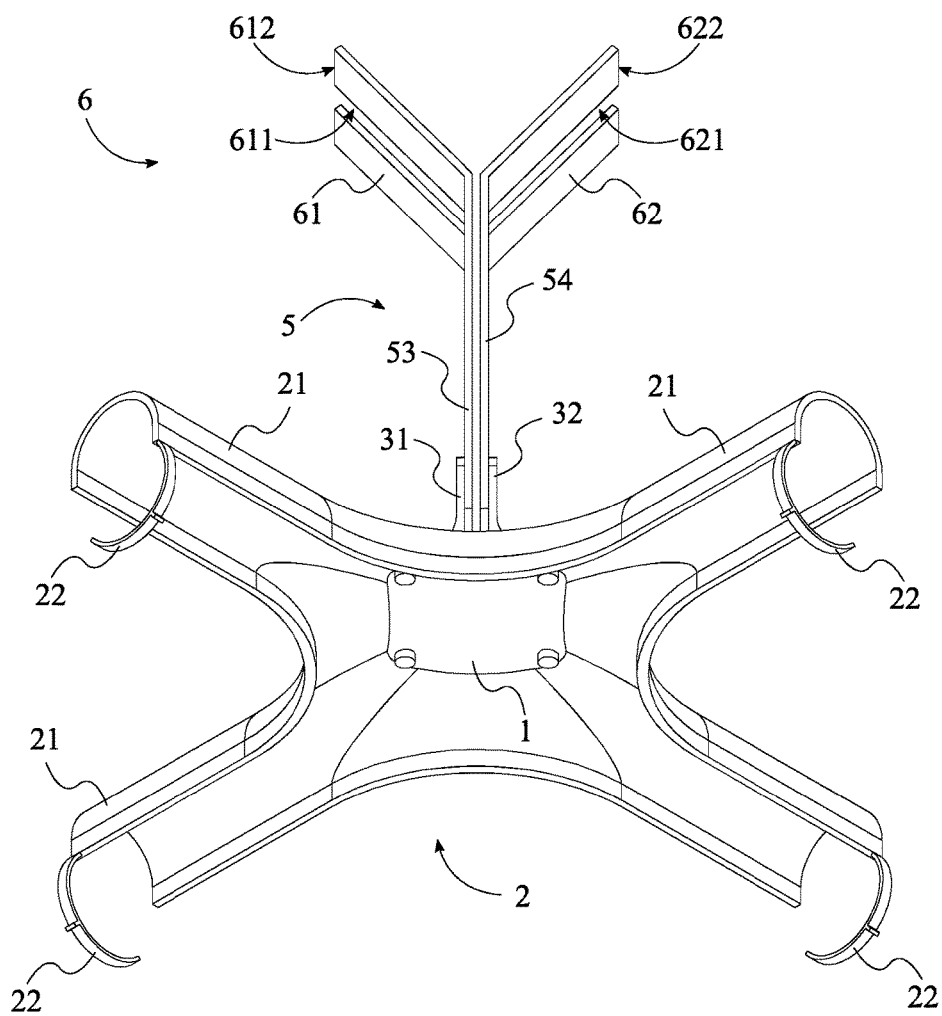
FIG. 2 is a bottom perspective view of the present invention.

In reference to FIG. 1 and FIG. 2, as described above, the robot-attachment assembly 2 enables the present invention to be mounted onto the UAV. To facilitate this, the robot-attachment assembly 2 comprises a plurality of mounting brackets 21 and a plurality of adjustable fasteners 22. The plurality of mounting brackets 21 is a rigid framework that is configured to conform to the shape of the UAV. That is, each of the plurality of mounting brackets 21 is advantageously positioned to form an anchor point, by which the present invention can be fixedly attached to the UAV. As such, the plurality of mounting brackets 21 is adjacently connected to the mounting plate 1. Additionally, the plurality of mounting brackets 21 is distributed across the mounting plate 1. Accordingly, the plurality of mounting brackets 21 is configured to correspond to the shape of the UAV onto which the present invention is mounted. Each of the plurality of adjustable fasteners 22 is adjacently connected to a corresponding bracket 211 from the plurality of mounting brackets 21. Consequently, the each of the plurality of adjustable fasteners 22 is retained in a position that facilitates mounting the present invention into the UAV. The plurality of adjustable fasteners 22 is positioned opposite to the mounting plate 1, across the plurality of mounting brackets 21. Thus positioned, the plurality of adjustable fasteners 22 forms a mounting system that is connected in between the plurality of mounting brackets 21 and the UAV. Each adjustable fastener 22 is preferably a hose-clamp or zip-tie that enables the robot-attachment assembly 2 to be affixed to UAVs of varying shape and size.

Figure 3:
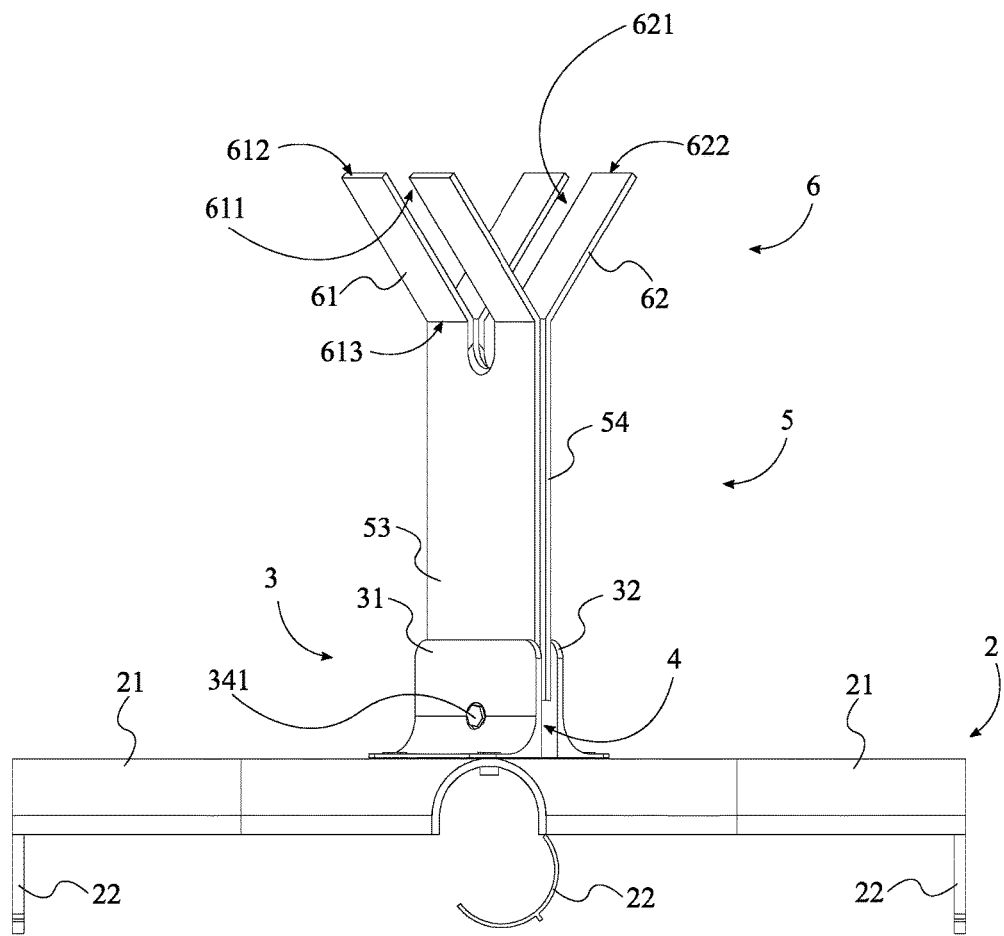
FIG. 3 is a front view of the present invention.
Figure 4:
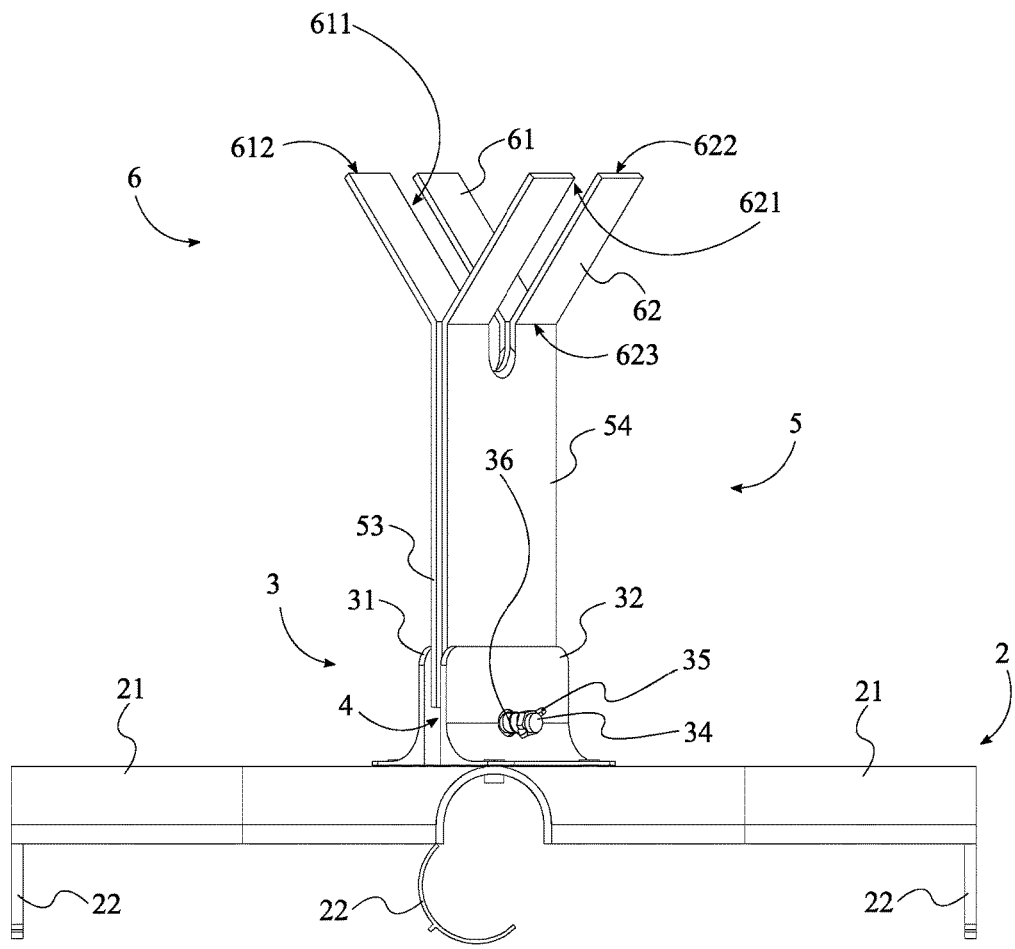
FIG. 4 is a rear view of the present invention.
Figure 5:
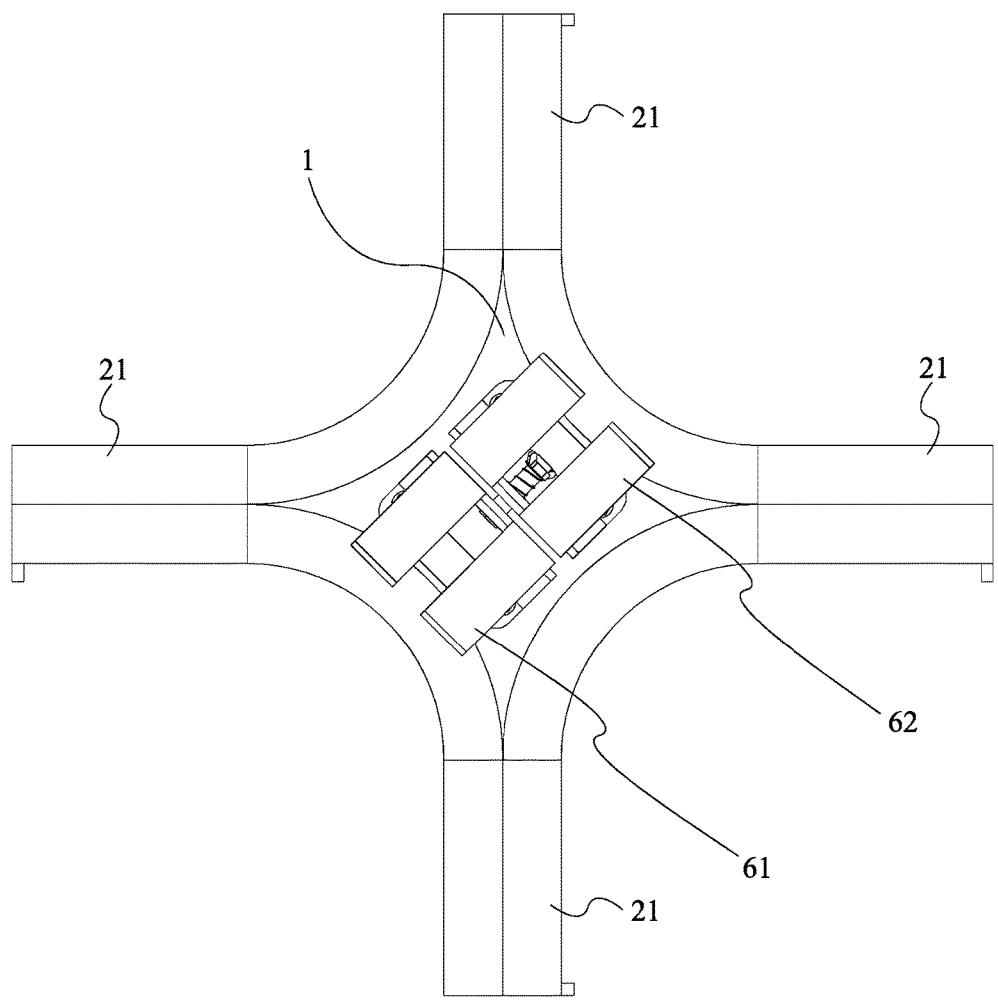
FIG. 5 is a top view of the present invention.
Figure 6:
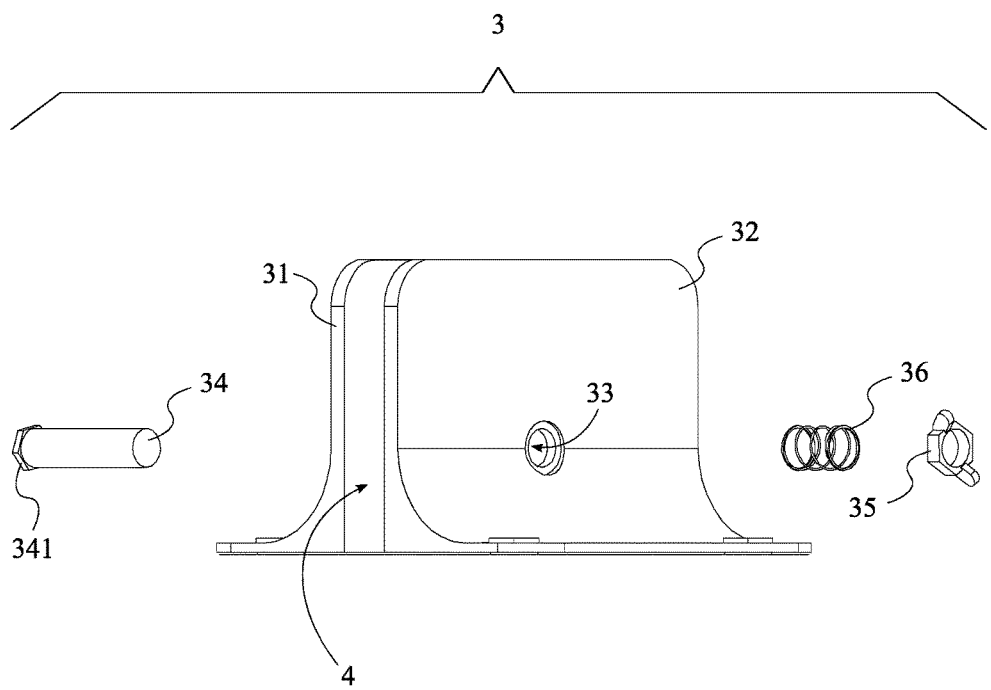
FIG. 6 is an exploded perspective view of the intermediary connection mechanism used in the present invention.

In reference to FIG. 3, FIG. 4, and FIG. 6, the present invention is designed such that the user is able to disconnect the extension member 5 from the mounting plate 1 as desired. To facilitate this, the intermediary connection mechanism 3 is preferably an adjustable clamp 3. Further, the mounting receptacle 4 is delineated by a first jaw 31 of the adjustable clamp 3 and a second jaw 32 of the adjustable clamp 3. As a result, the user is able to attach the manipulator system to the mounting plate 1 by inserting the first end 51 of the extension member 5 in between the first jaw 31 and the second jaw 32. The user is able to attach manipulator systems of varying shape and size to the mounting plate 1 by adjusting the distance between the first jaw 31 and the second jaw 32. To that end, the adjustable clamp 3 comprises a clamp-adjustment hole 33, a bolt 34, a nut 35, and a spring 36. The clamp-adjustment hole 33 traverses through the first jaw 31 and the second jaw 32. The bolt 34 engages through the clamp-adjustment hole 33 and the nut 35 is engaged along the bolt 34. Further, the first jaw 31 and the second jaw 32 are positioned in between the nut 35 and a head 341 of the bolt 34. Accordingly, the bolt 34 passes through the first jaw 31 and the second jaw 32 such that the user is able to modify the distance between the first jaw 31 and the second jaw 32 by moving the nut 35 along the bolt 34. The spring 36 is slidably engaged along the bolt 34. Additionally, the sprig is positioned in between the second jaw 32 and the nut 35. Consequently, the adjustable clamp 3 can be clamped onto manipulator systems without causing damage to delicate components. Further, the spring 36 acts as a dampener to absorb vibrations that would otherwise case the extension member 5 to be detached from the adjustable clamp 3.

In reference to FIG. 1, FIG. 4, and FIG. 7, preferably, the extension member 5 is designed to facilitate maintaining the aerial diverter in a stationary position relative to the UAV until the aerial diverter is mounted onto the power line. To achieve this functionality, the extension member 5 comprises a first bar 53 and a second bar 54. Additionally, the diverter-manipulation assembly 6 comprises a first guiding plate 61 and a second guiding plate. The first bar 53 is laterally mounted within the mounting receptacle 4. The second bar 54 is laterally mounted within the mounting receptacle 4. Additionally, the first bar 53 is positioned opposite to the second bar 54, across the mounting receptacle 4. Accordingly, the extension member 5 is works in concert with the diverter-manipulation assembly 6 and the intermediary connection mechanism 3 to act as a clamp that presses against the sides of the aerial diverter. Thus, holding the device in place. The first guiding plate 61 is terminally connected to the first bar 53. Additionally, first guiding plate 61 is offset from the first bar 53 by a first angle 63. Thus positioned, the first extension member 5 and the first guiding plate 61 act as a guide that facilitates mounting the aerial diverter onto the UAV. Similarly, the second guiding plate is terminally connected to the second bar 54. Likewise, the second guiding plate is offset from the second bar 54 by a second angle 64. Consequently, the first bar 53 and the second bar 54 act as clamps that press against the sides of the aerial diverter. Further, the first guiding plate 61 and the second guiding plate are offset from the second guiding plate by a third angle 65. Thus positioned, the first guiding plate 61 and the second guiding plate act as manipulators that hold the aerial diverter in an orientation that facilitates mounting the aerial diverter onto the power line. Specifically, the user is able to attach the aerial diverter to the present invention by first inserting the aerial diverter in between the first guiding plate 61 and the second guiding plate. The first guiding plate 61 and the second guiding plate reorient the aerial diverter so that the aerial diverter can be positioned between the first bar 53 and the second bar 54. The adjustable clamp 3 then presses the first bar 53 and the second bar 54 against the sides of the aerial diverter, holding the device in place.

In reference to FIG. 1 and FIG. 7, as described, the diverter-manipulation assembly 6 is designed to retain the aerial diverter in an orientation that facilitates mounting the aerial diverter onto the power line. Accordingly, the present invention further, comprises a first slot 611 and a second slot. The first slot 611 traverses through the first guiding plate 61. Additionally, the first slot 611 extends from a first lengthwise edge 612 of the first guiding plate 61 to a second lengthwise edge 613 of the first guiding plate 61. Consequently, the first guiding plate 61 is divided into two prongs that hold the aerial diverter in a desired orientation. Similarly, The second slot traverses through the second guiding plate. Additionally, the second slot extends from a first lengthwise edge 622 of the second guiding plate to a second lengthwise edge 623 of the second guiding plate. Accordingly, the second guiding plate is divided into two prongs that hold the aerial diverter in a desired orientation.

Figure 8:
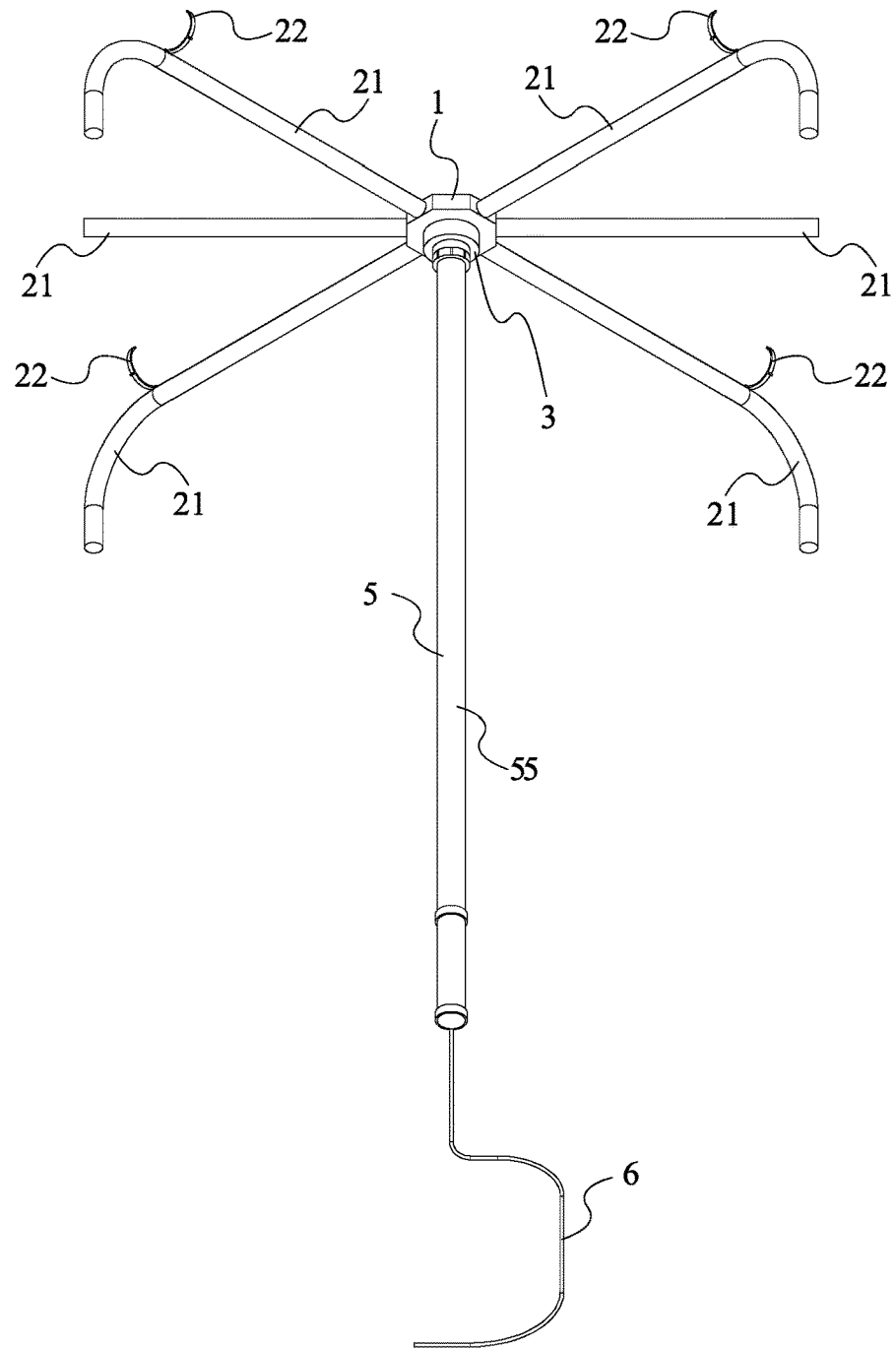
FIG. 8 is a bottom perspective view of an alternative embodiment of the present invention.
Figure 9:
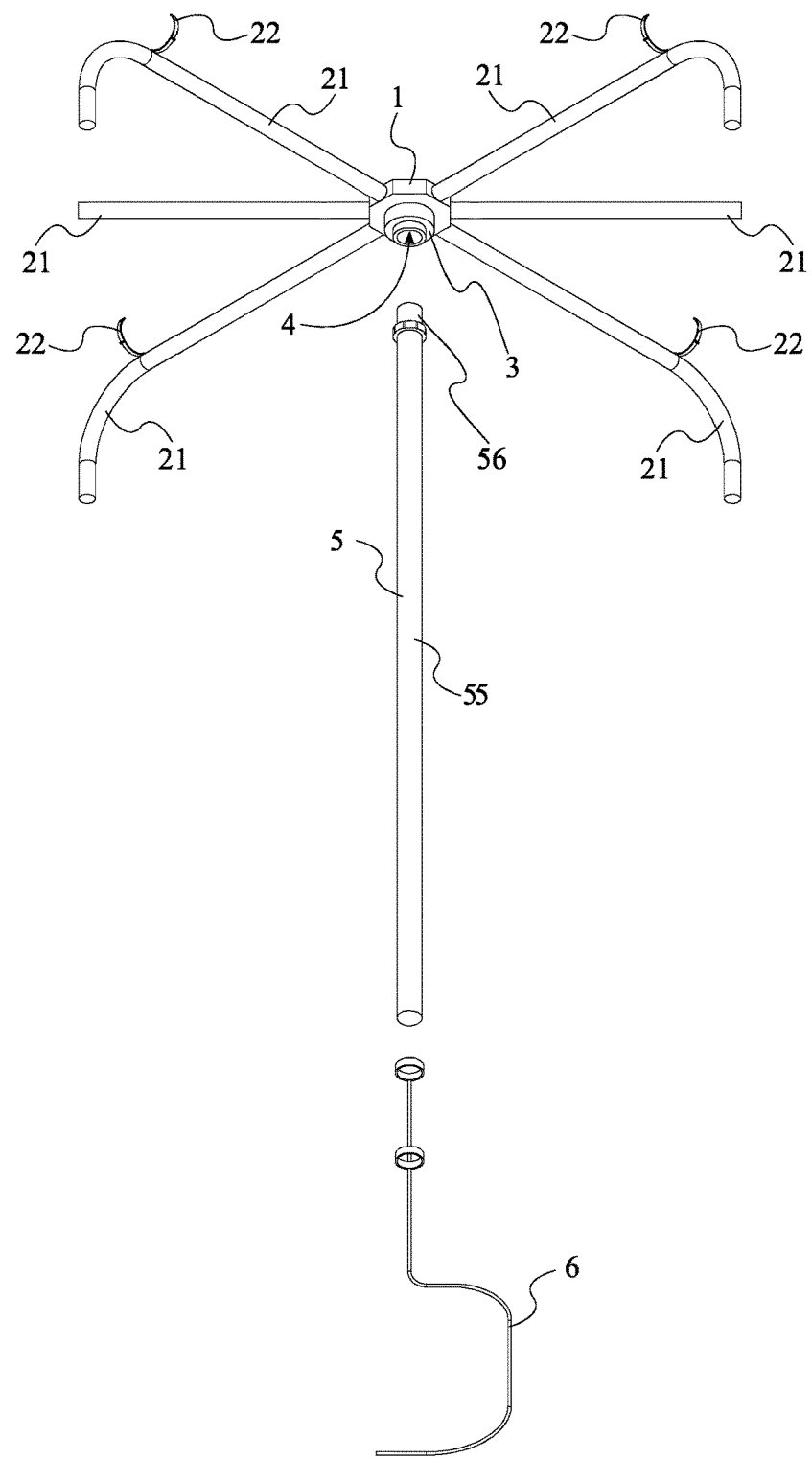
FIG. 9 is an exploded perspective view of an alternative embodiment of the present invention.

In reference to FIG. 8 and FIG. 9, in a first alternative embodiment, the present invention is designed to be mounted onto the underside of the UAV. This embodiment enables the UAV to be positioned above the power line when attaching the aerial diverter. To facilitate this, the extension member 5 is attached to the mounting plate 1 via a detachable fastening system, rather than a clamping mechanism. Specifically, the mounting receptacle 4 is a female threaded receptacle. Additionally, extension member 5 comprises a rod 55 and a male-threaded nipple 56. The male-threaded nipple 56 is terminally connected to the rod 55, opposite to the diverter-manipulation assembly 6 so that the rod 55 is used to maintain the diverter-manipulation assembly 6 in a position offset from the UAV. The male-threaded nipple 56 engages into the female threaded receptacle. As a result, the extension member 5 can be detachably connected to the intermediary connection mechanism 3. In the first alternative embodiment of the present invention, the diverter-manipulation assembly 6 is a hook. This enables the present invention to be quickly coupled to, or decoupled from, the aerial diverter.

Although the invention has been explained in relation to its preferred embodiment, it is to be understood that many other possible modifications and variations can be made without departing from the spirit and scope of the invention as hereinafter claimed.

What is claimed is:

1. A robotically assisted power line aerial diverter mounting tool comprising:
   a mounting plate;
   a robot-attachment assembly;
   an intermediary connection mechanism;
   a mounting receptacle;
   an extension member;
   a diverter-manipulation assembly;
   the robot-attachment assembly being mounted onto the mounting plate;
   the intermediary connection mechanism being mounted onto the mounting plate, opposite to the robot-attachment assembly;
   the mounting receptacle traversing into the intermediary connection mechanism, normal to the mounting plate;
   a first end of the extension member engaging into the mounting receptacle;
   the diverter-manipulation assembly being mounted onto a second end of the extension member, opposite to the mounting receptacle; and
   the diverter-manipulation assembly being a hook.

2. The robotically assisted power line aerial diverter mounting tool as claimed in claim 1 comprising:
   the robot-attachment assembly comprising a plurality of mounting brackets and a plurality of adjustable fasteners;
   the plurality of mounting brackets being adjacently connected to the mounting plate;
   the plurality of mounting brackets being distributed across the mounting plate;
   each of the plurality of adjustable fasteners being adjacently connected to a corresponding bracket from the plurality of mounting brackets; and
   the plurality of adjustable fasteners being positioned opposite to the mounting plate, across the plurality of mounting brackets.

3. The robotically assisted power line aerial diverter mounting tool as claimed in claim 1 comprising:
   the mounting receptacle being a female threaded receptacle;
   the extension member comprising a rod and a male-threaded nipple;
   the male-threaded nipple being terminally connected to the rod, opposite to the diverter-manipulation assembly; and
   the male-threaded nipple engaging into the female threaded receptacle.

4. A robotically assisted power line aerial diverter mounting tool comprising:
   a mounting plate;
   a robot-attachment assembly;
   an intermediary connection mechanism;
   a mounting receptacle;
   an extension member;
   a diverter-manipulation assembly;
   the intermediary connection mechanism being an adjustable clamp;
   the robot-attachment assembly being mounted onto the mounting plate;
   the intermediary connection mechanism being mounted onto the mounting plate, opposite to the robot-attachment assembly;
   the mounting receptacle traversing into the intermediary connection mechanism, normal to the mounting plate;
   a first end of the extension member engaging into the mounting receptacle;
   the diverter-manipulation assembly being mounted onto a second end of the extension member, opposite to the mounting receptacle; and
   the mounting receptacle being delineated by a first jaw of the adjustable clamp and a second jaw of the adjustable clamp.

5. The robotically assisted power line aerial diverter mounting tool as claimed in claim 4 comprising:
   the robot-attachment assembly comprising a plurality of mounting brackets and a plurality of adjustable fasteners;
   the plurality of mounting brackets being adjacently connected to the mounting plate;
   the plurality of mounting brackets being distributed across the mounting plate;
   each of the plurality of adjustable fasteners being adjacently connected to a corresponding bracket from the plurality of mounting brackets; and
   the plurality of adjustable fasteners being positioned opposite to the mounting plate, across the plurality of mounting brackets.

6. The robotically assisted power line aerial diverter mounting tool as claimed in claim 4 comprising:
   the adjustable clamp comprising a clamp-adjustment hole, a bolt, a nut, and a spring;
   the clamp-adjustment hole traversing through the first jaw and the second jaw;
   the bolt engaging through the clamp-adjustment hole;
   the nut being engaged along the bolt;
   the first jaw and the second jaw being positioned in between the nut and a head of the bolt;
   the spring being slidably engaged along the bolt; and
   the spring being positioned in between the second jaw and the nut.

7. The robotically assisted power line aerial diverter mounting tool as claimed in claim 4 comprising:
   the extension member comprising a first bar and a second bar;
   the diverter-manipulation assembly comprising a first guiding plate and a second guiding plate;
   the first bar being laterally mounted within the mounting receptacle;
   the second bar being laterally mounted within the mounting receptacle;
   the first bar being positioned opposite to the second bar, across the mounting receptacle;
   the first guiding plate being terminally connected to the first bar;
   the first guiding plate being offset from the first bar by a first angle;
   the second guiding plate being terminally connected to the second bar;
   the second guiding plate being offset from the second bar by a second angle; and
   the first guiding plate being offset from the second guiding plate by a third angle.

8. The robotically assisted power line aerial diverter mounting tool as claimed in claim 7 comprising:
- the diverter-manipulation assembly comprising a first slot;
- the first slot traversing through the first guiding plate; and
- the first slot extending from a first lengthwise edge of the first guiding plate to a second lengthwise edge of the first guiding plate.

9. The robotically assisted power line aerial diverter mounting tool as claimed in claim 7 comprising:
- the diverter-manipulation assembly comprising a second slot;
- the second slot traversing through the second guiding plate; and
- the second slot extending from a first lengthwise edge of the second guiding plate to a second lengthwise edge of the second guiding plate.

\* \* \* \* \*